Figure 1:
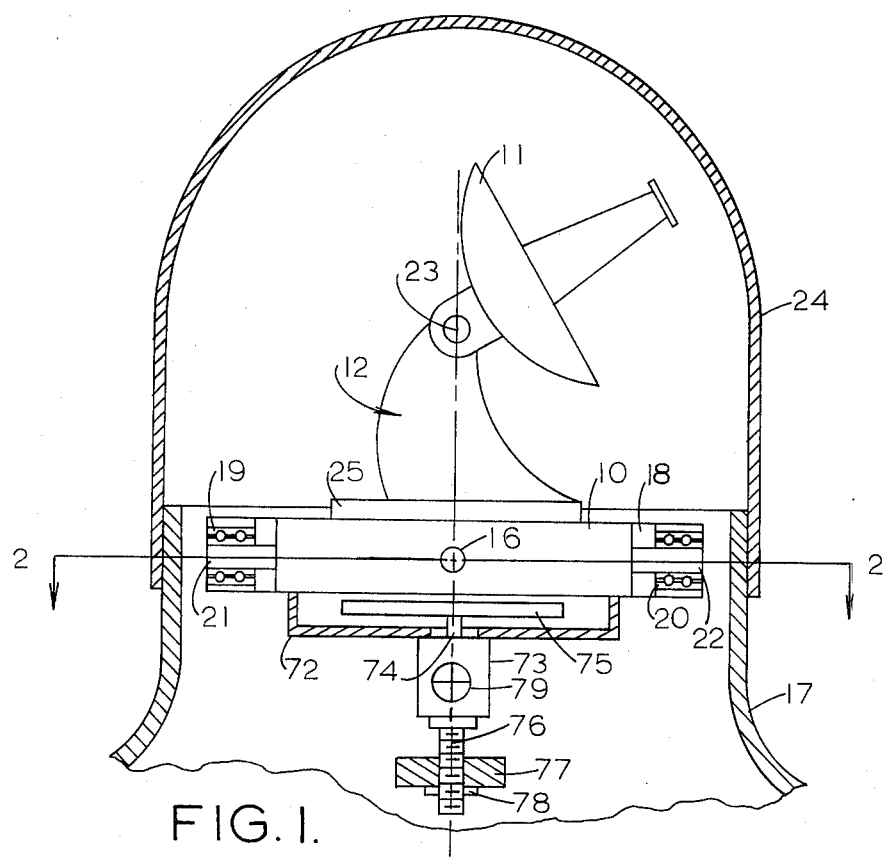

United States Patent [19]
Bieser

[11] 3,893,123
[45] July 1, 1975

[54] COMBINATION GYRO AND PENDULUM WEIGHT STABILIZED PLATFORM ANTENNA SYSTEM

[75] Inventor: Albert H. Bieser, Garland, Tex.

[73] Assignee: B E Industries, Garland, Tex.

[22] Filed: Sept. 12, 1973

[21] Appl. No.: 396,513

[52] U.S. Cl. .............. 343/706; 343/709; 343/758; 343/760; 343/765
[51] Int. Cl. ............................................ H01q 3/00
[58] Field of Search .......... 343/763, 765, 766, 706, 343/709, 758, 760, 765

[56] References Cited
UNITED STATES PATENTS
| | | | |
|---|---|---|---|
| 2,425,737 | 8/1947 | Hanna et al. | 343/756.5 |
| 2,477,574 | 8/1949 | Braddon | 343/756.5 |
| 2,924,824 | 2/1960 | Lanctot et al. | 343/756.5 |

Primary Examiner—Eli Lieberman
Attorney, Agent, or Firm—Warren H. Kintzinger

[57] ABSTRACT

A four-axis antenna pedestal with two controlled axes configured with elevation over azimuth on a right-angled gimbaled combination gravity and gyro stabilized platform. The assembly is suspended with right-angled pivotal axes in the same horizontal plane, and structure pivoted about the upper two controlled axes is statically balanced and the center of gravity of the entire pivotally mounted assembly is on the vertical axis and below the gimbal plane. The platform structure includes a gyro motor and rotor system for resisting acceleration-induced torque forces, and a lower counter weight is included to insure positioning of the center of gravity of the entire pivotally mounted assembly below the gimbal plane.

21 Claims, 7 Drawing Figures

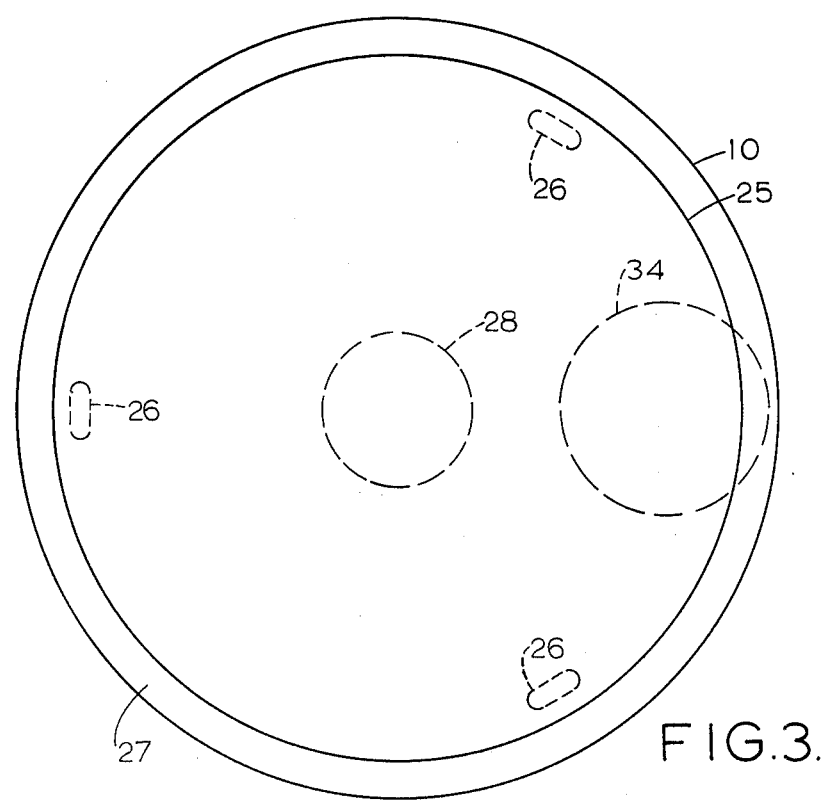
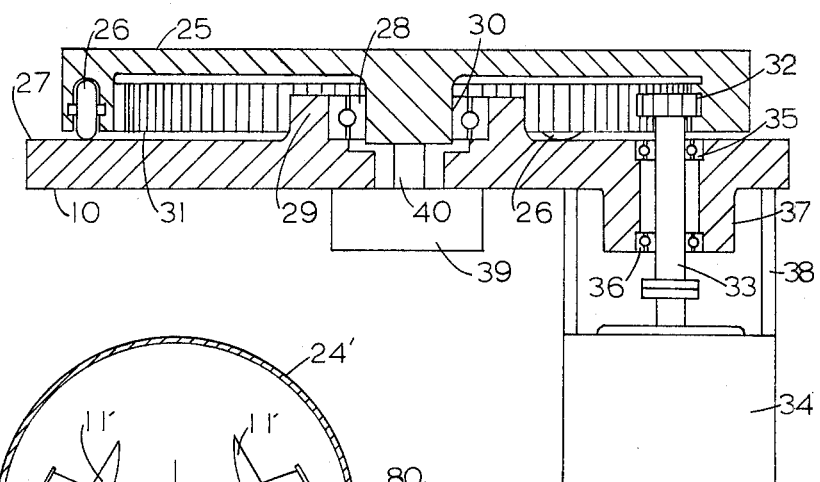
FIG.3.
FIG.4.
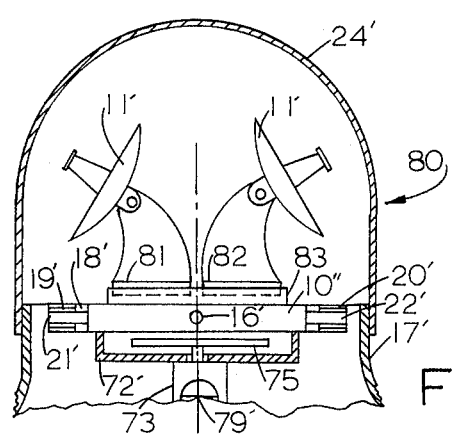
FIG.7.

COMBINATION GYRO AND PENDULUM WEIGHT STABILIZED PLATFORM ANTENNA SYSTEM

This invention relates in general to antenna mountings, and in particular to a multi-axis antenna mount system having a right angle gimbaled combination gravity and gyro stabilized platform with the center of gravity of the entire pivotally supported assembly substantially on the azimuth axis below the gimbal plane.

There are many requirements for tracking antennas for both military and commercial applications. These include, for example, satellite tracking shipboard maritime applications, and also a new requirement in airborne use with tethered baloons. Tracking antenna systems being supplied to meet present military needs are generally sophisticated and relatively expensive, as compared to system costs acceptable for many commercial applications, and even some military applications. There is a significant market developing for relatively low cost, but reliable, antenna systems, particularly with the new L-band frequencies allocated recently for maritime satellite communication.

Such antennas must first acquire, through some form of control that may be remote control, the desired target, such as a communication satellite in stationary earth orbit requiring, as a minimum, elevation and azimuth control. Once the target has been acquired, the pointing attitude of the antenna must be updated for changes in ship's heading and ship's position. Ship's heading changes are usually automatically compensated in the azmuth axis that may be slaved to a ship's compass and ship's position changes, which are relatively insignificant over short time periods, are, with many installations, updated manually. (A 100 mile headway represents less than 2° tracking error.) The problems are further intensified when two primary ship motion disturbances, pitch and roll, are considered. These motions require that the antenna control system automatically compensate for angular changes quickly and precisely to avoid excessive pointing errors. While 1° of pointing error may be unacceptable to many high performance, narrow beam, military systems, a 6° or even a 10° error may be far from catastrophic in a wide beam, L-band system with a nominal gain of 12–14 db when the system is designed with enough margin to tolerate a 0.5 or 1.0 db degradation under certain "worst conditions."

Two-axes and three-axes tracking antenna mounts do not achieve desired objectives. The two-axes pedestal is inherently limited to less than full hemispherical coverage by the "key-hole" effect when the target is near a line extension of the primary axis where accelerations required for corrective motions become intolerable. A three-axes pedestal antenna mounting provides full hemispherical coverage with, however, added complexity and cost with the control systems required highly sophisticated having a closed loop servo control for each axis along with the associated rate-gyros, accelerometers and other equipment even at times including a digital computer to perform the complex coordinate conversions.

Tethered baloons while advantageously capable of supporting antennas at great height (3,000 feet as a practical example and even higher), encounter problems imposing antenna system requirements in common with shipboard use. Motions imposed on a balloon supported antenna system are typically: pitch — 0° to 25°, variable at 6°, maximum roll ± 10°, 3° per second, maximum, and yaw ± 15°, 5° per second, maximum, with respect to wind direction. While selected aerodynamically shaped balloons give highly stable yaw, pitch and roll performance the balloon platform is not position fixed from an antenna point of view, and also experiences wind drift due to the fact that it is tethered. Close control of the direction of high frequency receiving and transmitting antennas is important in implementing a system using baloon supported signal communicating antennas. This requires a stable microwave antenna platform capable of compensating for specific anomalies introduced through balloon support along with direction and velocity change induced variations. Further, an acceptable mean time between failures is extremely important with antenna systems usage, both in such air-borne use and in maritime use.

It is, therefore, a principal object of this invention to provide an antenna mount system having gravity with gyro damping compensating pitch and roll.

Another object is to provide such an antenna and antenna mount system with elevation and azimuth, as two controlled axes, configured with elevation over azimuth on a right-angled gimbaled horizontal combination gravity and gyro stabilized platform.

A further object is to have yaw compensation with a magnetic compass slaved servo driving azimuth setting up to 10° per second.

Another object is to provide such an antenna mount system having high accuracy, quick, sure responsiveness, reliability, and structural simplicity with significant cost savings over many existing antenna mount systems.

Features of this invention useful in accomplishing the above objects include, in a combination gyro and pendulum weight stabilized platform antenna system, location of the center of gravity of an antenna and the gimbal antenna mounting structure on the vertically oriented azimuth axis at a point directly below the intersection of the pitch and roll axes. The optimum vertical location of the center of gravity is a trade-off between friction hysteresis and worst case linear accelerations that actually vary with different types and sizes of ships, and with different location placements aboard a vessel. These factors are applicable to a greater or lesser extent, dependent on the parameters, to installations on balloons. In minimizing errors due to friction and hysteresis, the center of gravity ideally should be located as far as possible below the gimbal axis; while to minimize errors due to horizontal linear acceleration, the center of gravity ideally would be on the gimbal axis. An adjustably positionable counter weight is provided on a downward extended bottom threaded stud extension from the bottom of the antenna stabilized gimbaled platform in order that the center of gravity may be adjusted upward and downward for any particular installation to optimize target tracking performance operational results for that installation. The four-axes design hereof uses two axes with a control interface while the other two axes are passively slaved to gravity. Thus, the complexity of control required for the two active axes is far less than with most conventional two and three axes systems with the only corrective commands required for the two axes in a ship during normal operation being those due to changes in ship's heading and position. This can be accomplished with the use of commercially available stepping motors such as used in some installations, along with associated controls and simple position feedback loops for the two axes. While conventional servo motors may be used, use of stepping motors provides a significant advantage in that residual torque due to their permanent magnetic fields imposes a requirement for power to the two actively controlled axes only when heading changes occur or major distances have been covered. Because, usually, neither of these conditions occurs frequently, the pedestal is in a zero power non-driven state through a high percentage of its useful life. Further, while a conventional servo controlled antenna would literally "fall down" with power failure, the present design maintains the last set axes position, before power failure, and thereby maintains communications for long periods of time as long as the ship's heading is maintained within a few degrees.

Specific embodiments representing what are presently regarded as the best modes of carrying out the invention are illustrated in the accompanying drawings.

Figure 2:
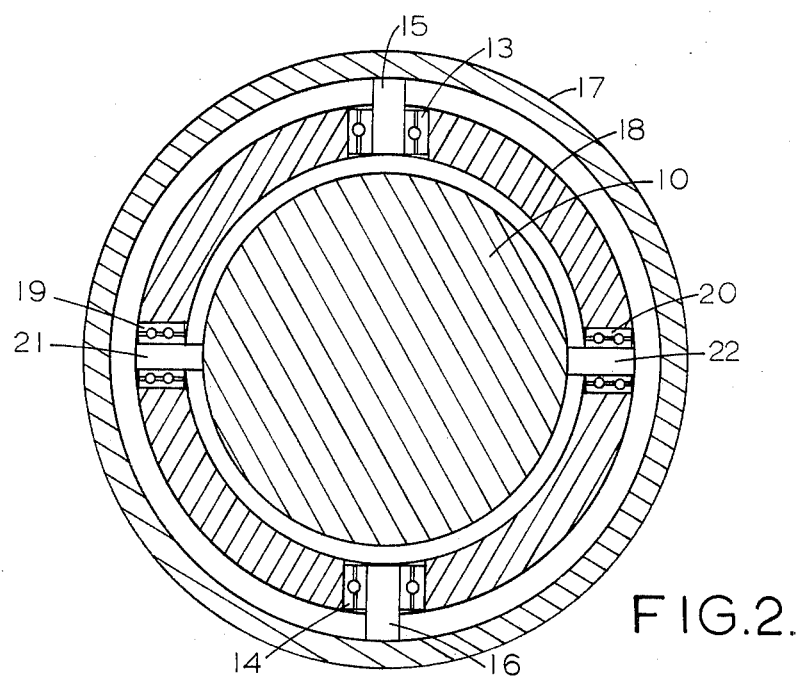
Figure 5:
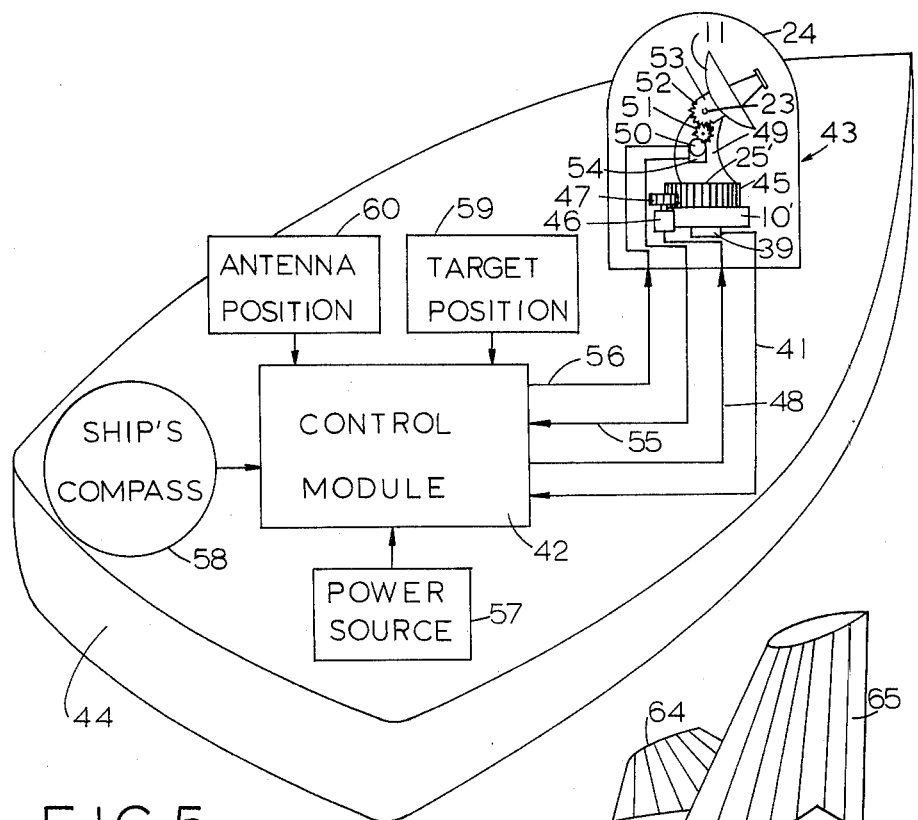
Figure 6:
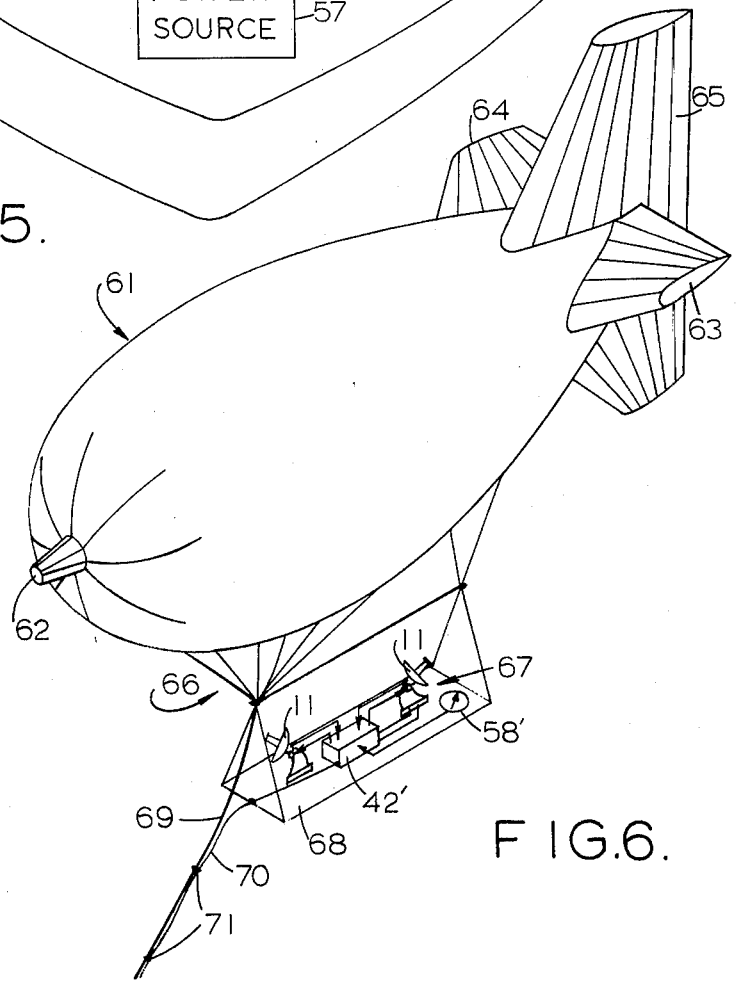

In the drawings:

FIG. 1 represents a partially broken away and sectioned side elevation view of a microwave antenna, multi-axis antenna mount pedestal system with a right angled axes gimbaled combination gravity and gyro stabilized platform;

FIG. 2, a horizontal section taken along line 2—2 of FIG. 1 showing right angled axes gimbaled mounting detail;

FIG. 3, a partial top plan view of a stabilized platform;

FIG. 4, a partial side elevation view partially in section showing detail of an azimuth drive in the gimbaled combination gravity and gyro stabilized platform of FIG. 3;

FIG. 5, a diagramatic combination block schematic showing of a shipboard installation of a multi-axis antenna mount pedestal system such as that of FIG. 1 with a control system;

FIG. 6, a showing of a tethered balloon supported antenna and control system with two antennas having a mounting system such as that of FIG. 1, one used for transmitting and the other for receiving; and, FIG. 7, a microwave antenna mounting system such as that of FIG. 1 with, however, two adjustably positionable antennas mounted on the same stabilized platform.

Referring to the drawings:

The platform 10 of the antenna 11 support structure 12 of FIG. 1 is shown (referring also to FIG. 2) to be gimbal supported with two support bearings 13 and 14 rotatable about bearing support spindles 15 and 16 fixed to project inwardly on the same axis from opposite sides of the fixed mount housing 17. The bearings 13 and 14 support gimbal ring 18 that in turn has two bearings 19 and 20 supported by the ring 18 on an intersecting axis at right angles to and co-planar with the axis of bearings 13 and 14. The bearings 19 and 20 rotatably support spindles 21 and 22 that are mounted to project outwardly from opposite sides of gimbaled platform 10 on a common axis. The antenna 11 is mounted to pivot about elevation axis 23 in an elevation over azimuth configuration, to be described in greater detail later, contained within a protective radome 24 mounted on housing 17 in a conventional manner (detail not shown). The antenna pedestal structure 12 also includes an antenna mount azimuth rotatable base 25 supported on a gimbaled platform 10 for rotation about the vertical azimuth axis as azimuth setting adjustments are being made. This may be accomplished with the platform 10 and rotatable base 25 structure of FIGS. 3 and 4 having rotatable base 25 vertically supported by roller wheels 26 on the top surface 27 of platform 10, and laterally by bearing 28 contained in annular bearing retaining shoulder 29 of platform 10 and with the inner race of bearing 28 on the center downward hub projection 30 of base 25. Rotatable base 25 includes an internal ring gear 31 driven by spur gear 32 on the drive shaft assembly 33 of a stepping motor 34 of conventional construction. This is with an extension section of shaft 33 mounted by bearings 35 and 36 in bearing and drive shaft support shoulder 37 of platform 10, and motor 34 mounted on platform 10 by a motor mount 38 of conventional construction. A synchro relative turn position signal unit 39 is mounted to the bottom of platform 10 at the center azimuth axis with an input turn position shaft 40 of the synchro unit 39 extended upward on the azimuth axis to a connection with hub projection 30 of rotatable base 25. This structure is provided in order that the synchro unit 39 sense the relative rotative state between the base 25 and platform 10 and send a feedback signal thereof through line 41 back to a control module 42 as shown in FIG. 5.

With the combination block schematic and shipboard installation of FIG. 5 the antenna unit 43, shown installed in a ship 44, uses an alternate azimuth drive system for rotatable base 25' that mounts antenna 11. This drive system uses a ring gear 45 on the outer periphery of the azimuth setting rotatable base 25' with ring gear 45 driven by a servo motor 46 through spur gear 47. Servo motor 46 (preferably a stepping motor) is control driven through line 48 out of control module 42 connected to the stepping motor 46 mounted on gimbaled platform 10'. Antenna pedestal member 49 that pivotally mounts antenna 11 to pivot about elevation axis 23 mounts a servo motor 50 (preferably a stepping motor) that drives a gear train 51 driving a gear sector 52 on the rear of the antenna rear elevation mount extension 53 centered on the elevation axis 23 for antenna elevation settings. A synchro unit 54 with motor 50 sends an elevation setting feedback signal back through line 55 to control module 42 that in turn supplies controlled driving power back through line 56 from the control module 42 to stepping motor 50 for elevation setting drive control.

A shipboard power source 57 supplies power to control module 42 and through the module to motors 46 and 50 and for other portions of the system. An output from the ships compass 58 is fed to the control module 42 in order that the azimuth position setting may be slaved to the ship's compass 58 although in some installations azimuth settings may be periodic manual settings. A target position information source 59 is connected for feeding target position information into control module 42 and an antenna and ship position information source 60 is connected for feeding antenna position information to the control module 42. These information sources 59 and 60 could be part of a ship's automatic navigation system (detail not shown) or partially so or be periodic mannually set inputs. Please note that while conventional servo motors may be used in controlled elevation and azimuth setting drives, use of stepping motors provides a significant advantage in that residual torque due to their permanent magnet fields imposes a requirement for power to either and/or both the two actively controlled axes only when the heading changes or major distances have been covered. Since neither of these conditions occurs frequently, the pedestal is in a zero power non-driven state through a high percentage of its useful life. A conventional servo controlled antenna, particularly three and four axes controlled antennas, would literally "fall down" with power failure while the present design, using stepping motors on two controlled axes and having two gimbaled axes for the platform 10 not requiring control, maintains the last set axes position before power failure. Thus, communications are thereby maintained for long periods of time as long as a ship's heading (or baloon's direction with wind direction) is maintained within a few degrees.

Referring also to FIG. 6 a tethered balloon 61 with nose cone 62, horizontal left and right stabilizers 63 and 64 and vertical fin structure 65, has a cable system 66 supporting an antenna system 67 on a suspended platform 68. The balloon 61 is connected to a tether cable 69 leading to a play in and out winch system at a control station on the ground (detail not shown). A power line along with any control leads desired for some uses are also connected in a cable 70 from the control station on the ground to the antenna system 67 on suspended platform 68 with cable 70 fastened at intervals 71 to tether cable 69 for support and to keep the cables 69 and 70 generally together. Two antennas 11, such as that of FIGS. 1 through 4, or using the alternate azimuth drive of FIG. 5, are carried on suspended platform 68 along with a control module 42', similar to the module 42 used in the ship 44 of FIG. 5, in an elevation and azimuth control system slaved to compass 58' for the two antennas. The antennas 11, each usable in both the transmit and receive modes of operation, are subject to motions imposed on a balloon with yaw variations through all 360° of the compass. Such a balloon installation is not position fixable as in an antenna tower and all degrees of freedom are available to the influence of the wind to varying degrees. Obviously, the requirements imposed on antenna structures supported by a balloon have much in common with antenna structures and systems installed for shipboard use.

Referring again to the antenna 11 pedestal structure 12 with a gimbaled platform 10 of FIG. 1, a platform frame mount structure 72 on the bottom of platform 10 mounts a gyro drive motor 73 centered on the azimuth axis and having a vertical drive shaft 74 extending up to drive gyro rotor 75 in, generally, a horizontal rotational plane within the mount structure 72 closely adjacent the plane of the right angled gimbal axes. A threaded stud 76 extends down from the bottom of motor 73 to mount a counterweight 77 adjustably threaded thereon for vertical adjustment of the center of gravity of the entire gimbal supported antenna pedestal system structure. Position limit nut 78 is useful in locking a vertically adjusted position of counterweight 77 and thereby fixing the vertical adjustment of the center of gravity of the structure shown to be on the vertical azimuth axis by the C. G. symbol 79 on the motor 73. The upper two elevation over azimuth axes for the antenna 11 structure are statically balanced and the center of gravity of the entire gimbal supported structure is positioned on the vertical axis at a point below the gimbal plane. This is an arrangement tending to maintain the pedestal vertical axis and azimuth axis coaxial and on true vertical due to gravity, theoretically independent of ships (or balloons) motion. Slight errors, however, are introduced due to bearing friction and necessary cable wraps and acceleration induced errors. Linear acceleration can be the most significant source of pointing errors particularly, for example, with an antenna placed on a mast 100 feet above and forward of pitch, roll and yaw centers of rotation linear accelerations in heavy seas being as high as 0.2G's to result in pointing errors as high as 10°. With such a gravity slaved gimbaled system viscous damping techniques may be employed at the two free gimbal axes to minimize "worst condition" errors and minimize oscillation at the natural frequency of the pendulum. Optimum vertical location of the C.G. (center of gravity) on the azimuth axis directly below the pitch and roll axes is a function of two opposing parameters: bearing friction along with cable hysteresis, and linear acceleration components of pitch and yaw. In minimizing errors due to friction and hysteresis, the center of gravity ideally should be as far as possible below the gimbal axis. In minimizing errors due to horizontal acceleration, however, the center of gravity ideally would have to be on the gimbal axes. This trade off can be troublesome since while one parameter is reasonably predictable the other parameter varies for a number of factors. Addition of the gyro system with gyro rotor 75, however, helps in improving performance with the rotor 75 close to the plane of the two gimbal axes. Vibration with any slight unbalance in the gyro rotor flywheel helps improve accuracy by minimizing static friction in the gimbal bearings.

With reference to the antenna system 80 of FIG. 7 two antennas 11" having elevation over azimuth configurations each individually positioned in azimuth either manually or by servo systems (detail not shown) with rotational inserts 81 and 82 in azimuth rotational base 83. Each antenna is so balanced that the individual positioned rotational adjustment thereof does not change balance of base 83 that is rotatable for azimuth adjustment of base 83 and bodily body antennas 11' mounted thereon. Support of platform 10" and the function of gravity and gyro stabilization thereof is substantially the same as with that of the single antenna 11 embodiments described hereinbefore and will not be repeated again here. Drive (not shown) for antenna support base 83 and in turn for individual bases 81 and 82 could be much the same as either that of FIG. 4 or that of FIG. 5.

Whereas this invention is herein illustrated and described with respect to several embodiments hereof, it should be realized that various changes may be made without departing from essential contributions to the art made by the teachings hereof.

I claim:

1. In an antenna mounting system: a plural axis antenna pedestal including a vertical axis and having a right angled gimbaled, combination gravity slaved and gyro stabilized platform; the right angled axes of the gimbaled platform lying in a common plane intersecting the symmetrical axis of the platform; gyro motor means and rotor means vertically mounted for rotor rotation in a plane normal to the vertical axis of the pedestal; counterweight mass means positioned below the gimbaled plane of said platform; and with the mass and positioning of said counterweight mass means insuring positioning of the center of gravity of the entire gimbaled platform along with antenna means and other structure supported by the gimbaled platform, below the gimbaled plane of said platform; and wherein said antenna means and antenna mounting structure is rotatably supported on said gimbaled platform for rotation about said vertical axis.

2. The antenna mounting system of claim 1, wherein roller support means on said antenna mounting structure provides free rolling support on said gimbaled platform.

3. The antenna mounting system of claim 2, wherein drive means is mounted on said gimbaled platform; and output means from said drive means in drive engagement with said antenna mounting structure for driving the antenna mounting structure in rotation about said vertical axis.

4. The antenna mounting system of claim 3, wherein a stepping motor with permanent magnet field residual position holding torque is included in said drive means in drive engagement with said antenna mounting structure.

5. The antenna mounting system of claim 1, wherein said antenna mounting structure supported on said gimbaled platform includes both an elevation axis and said vertical axis in an elevation over azimuth configuration.

6. The antenna mounting system of claim 1, wherein both elevation drive means and azimuth drive means are included in said antenna mounting system.

7. The antenna mounting system of claim 6, with drive position control means provided exterior to the structure supported by said gimbaled platform; and first and second control power interconnect means interconnecting said drive position control means with, individually, both said azimuth drive means and said elevation drive means.

8. The antenna mounting system of claim 7, also including first and second signal feedback signal generators having sensing input elements connected to span said azimuth and elevation axes, respectively; and first and second signal feedback generators, respectively, to said drive position control means as parts of closed servo control loops.

9. The antenna mounting system of claim 7, wherein both said elevation drive means and said azimuth drive means each include a stepping motor with permanent magnet field residual position holding torque when not being driven.

10. The antenna mounting system of claim 1, wherein said gyro rotor is in the region of said gimbaled platform.

11. The antenna mounting system of claim 1, wherein said counterweight mass means is a relatively heavy weight adjustably threaded on a stud extension downward from said gimbaled platform.

12. The antenna mounting system of claim 11, wherein said gyro motor is mounted to and below said gimbaled platform with the gyro rotor positioned above the gyro motor; and with said stud extension fastened to the bottom of said gyro motor.

13. The antenna mounting system of claim 3, wherein said drive means is slaved to compass signal means of a compass system for compass signal controlled azimuth setting control.

14. The antenna mounting system of claim 13, installed on a water born ship with both elevation drive means and azimuth drive means included in said antenna mounting system; and with drive position control means provided exterior to the structure supported by said gimbaled platform; and first and second control power interconnect means interconnecting said drive position control means with, individually, both said azimuth drive means and said elevation drive means.

15. The antenna mounting system of claim 13, supported by a balloon; and with said compass system also supported by said balloon.

16. The antenna mounting system of claim 15, with said balloon a ground station tethered balloon; and power cable means interconnecting said ground station and said balloon.

17. The antenna mounting system of claim 16, with a plurality of individual antennas suspended from said balloon.

18. The antenna mounting system of claim 17, with a common servo control system connected in a control servo loop system to the active control driven position set axes of the plurality of individual antennas suspended from said balloon.

19. The antenna mounting system of claim 1, wherein said antenna means and the antenna mounting structure supported on said gimbaled platform is statically balanced about the azimuth axis.

20. The antenna mounting system of claim 19, wherein a plurality of individual antennas are mounted on said gimbaled platform.

21. The antenna mounting system of claim 20, wherein each of said plurality of individual antennas are individually rotatably mounted in a common base rotatably mounted for azimuth position setting of the base and bodily the antennas carried by said base.

* * * * *